Patented Mar. 30, 1954

2,673,843

UNITED STATES PATENT OFFICE 2,673,843

LIQUEFACTION OF SILICONE RUBBER GUM AND PRODUCTS THEREOF

Bingham J. Humphrey, Mount Carmel, and Harry H. Wasserman, Hamden, Conn., assignors to The Connecticut Hard Rubber Company, New Haven, Conn., a corporation of Connecticut No Drawing. Application May 17, 1951,
Serial No. 226,942

3 Claims. (Cl. 260—2.3)

This invention relates to the liquefaction of silicone rubber, and to various uses of the product thus obtained, and more particularly to the liquefaction of the rubber by the depolymerization thereof or chemical action affecting the molecules thereof whereby the high or long-chain polymers, which are solid, are broken down into smaller molecular groups, which are liquid.

Commercial uncured silicone rubber is a high-molecular-weight polymer somewhat rubberlike and resilient in compression. Some commercial varieties do not plasticize easily and are difficult to handle in the manufacture of useful materials from it. For a number of reasons it is advantageous to liquefy the rubber, as it can be more easily employed in some instances in its liquid form than in its solid form, and in some instances it is advantageous that the liquefaction process be such that the product can be either stabilized in its liquid form or readily regenerated into its solid form.

One of the reasons for liquefying the solid rubber is to facilitate the dispersion therein of reinforcing pigments such as diatomaceous earth, titanium dioxide or others, to improve certain qualities of the rubber. For example, a hydrocarbon rubber has a higher tensile strength and a greater elongation factor than silicone rubber. These qualities are produced in a large part in hydrocarbon rubber by the proper incorporation therein of a finely divided pigment such as colloidal carbon, which exerts a reinforcing action in the compound. This has suggested a similar incorporation of a proper pigment in silicone rubbers to effect a similar strengthening of the product, and overcome the evident weakness of this type of rubbers, without interfering with certain properties which silicone rubbers possess superior to those of hydrocarbon rubber.

Owing to the difficulty of properly working and plasticizing certain silicone rubbers, a thorough and intimate dispersion of such reinforcing agents has been difficult to obtain. It has been found, however, that a good dispersion can be obtained if the silicone rubber is first liquefied and the pigment, such as diatomaceous earth, added and mixed therewith while the polymer is in liquid form. The rubber may then be regenerated or restored to its solid form and employed as before. As will be more fully explained below, the reinforced rubber produced in this manner is superior to that produced by the conventional milling method in tensile strength, in elongation, and also in hardness, due to the more uniform and intimate dispersion of the pigment.

There are also other advantages to be obtained from liquefaction of the silicone rubber. The process can, for example, be successfully used in reclaiming, and particularly in reclaiming cured or uncured silicone rubber which has been used as a coating on glass fabric. On account of the properties of the glass fibers it is difficult to grind sheets of this material coated with cured silicone rubber to reuse the rubber in the usual way. If, however, the rubber upon the sheets is liquefied by the present process, the resulting solution may be filtered to screen out the glass fibers and the rubber recovered in liquid form and then regenerated to its solid form for reuse practically as if it were new rubber.

Also the liquefied silicone rubber may be stabilized in its liquid form and used in this form as a dipping and impregnating agent to impregnate porous sheets or fabrics, which process requires much less work than that required by the conventional sheeting and milling process. It is also more convenient than the process of dissolving the rubber, impregnating the desired material with the solution, and then recovering the solvent. There are also a number of other uses for the liquefied rubber which will readily suggest themselves.

One object of the present invention is to provide a process for liquefying silicone rubber.

A still further object of the invention is to provide a novel process for the liquefaction of silicone rubber such that the resulting product may be readily regenerated or restored to its solid form by a simple and inexpensive procedure.

A still further object of the invention is to provide a new and improved method of introducing reinforcing pigments into silicone rubber by first liquefying the rubber, obtaining a thorough dispersion of the pigment in the liquefied rubber, and then regenerating the rubber into its solid form.

Still another object of the invention is to provide a method of liquefying silicone rubber by chemical reaction or by depolymerization of the polymer whereby the high or long-chain polymers break down into smaller groups.

Still another object of the invention is to provide a process of liquefying silicone rubber such that the product may be stabilized in its liquid form so as to be usefully employed in this form.

Still another object of the invention is to provide a new and improved process for reclaiming cured or uncured silicone rubber from products into which it has been incorporated.

To these and other ends the invention consists in the novel processes and combinations of steps herein described, and in the products obtained from these processes.

According to the present invention, silicone rubber is converted to a more or less syrupy liquid by treating it with any of a number of chemical compounds, particularly anhydrous acids such as hydrochloric, hydrobromic and hydriodic acids, certain other acids free or practically free from water such as sulfuric, oxalic, benzoic or the like, certain acid chlorides such as thionyl chloride, and certain halides that readily hydrolyze to yield hydrochloric acids, particularly titanium tetrachloride, stannic chloride, and silicon tetrachloride. When either a polymerized uncured silicone rubber or one that has been completely cured is treated with any of these materials, it becomes liquid more or less readily, and, as stated above, in this liquid state can be used for a number of purposes and subjected to a variety of treatments that are difficult or impossible with the initial gummy mass.

When it is desired to return the liquid silicone to its original gummy consistency, this can be readily accomplished in a number of different ways, which constitute virtual reversals of the liquefying process. Usually the methods of accomplishing this reversal of the liquefying process will consist of the removal of the liquefying agent by physical means, or by chemical reaction (neutralization or hydrolysis, for example).

One satisfactory method of carrying out our liquefying process with a polymerized silicone rubber is by the use of hydrochloric acid gas, which process, in detail, is as follows:

*Example 1*

One pound of polymerized silicone rubber (the commercial product of the General Electric Company known as 9979–G) is shredded by passing it once through a rubber mill with its rolls set relatively close together. This shredded rubber may be then placed in a three-neck flask. One neck of this flask is used for the introduction of the shredded rubber, the second is connected to a generator of hydrochloric acid gas, while the third neck is connected to the outside air as an exhaust. Each of the two last-named connections may be made through a calcium chloride drying tube, if desired, in order to eliminate excess moisture from the flask in which the reaction takes place.

The hydrochloric acid gas generator may be of usual construction or it may be a cylinder of the gas under pressure. A pressure indicator arranged to show the small pressure in the liquefying vessel is connected to it. The pressure needed (one to two inches of water pressure) is usually only that sufficient to maintain a flow of the gas into the flask containing the gum.

As the reaction proceeds, the pressure within the liquefier flask drops as the hydrochloric acid gas is absorbed by the shredded silicone gum. The pressure can be maintained at a convenient level by adding more hydrochloric acid gas, if necessary. A room temperature of approximately 70° F. is maintained.

Liquefaction begins at once and is complete under the operating conditions noted in 4 to 6 hours. At that point the consistency of the liquefied gum is approximately that of honey. Longer continued treatment of the liquid with hydrochloric acid gas may make the liquid thinner, but a honey consistency is about as thin as the liquid can be made without requiring an undue amount of time, and such a consistency is satisfactory for most purposes. More or less gas is added depending on whether the desired liquid product is to be a thin liquid or a viscous liquid.

Gum liquefied by gaseous hydrochloric acid, as described above, can be restored to its gummy original state by removal of the gaseous hydrochloric acid from the mass in a number of ways, as follows: (1) By exposure to air, such as being allowed to stand for 24 to 48 hours; (2) by blowing or bubbling air or nitrogen through the mass to carry away the hydrochloric acid gas; (3) by gentle heating of the liquid rubber; (4) by introducing water or steam into the liquid to dissolve the hydrochloric acid gas; and (5) by neutralizing the acid in the mass by adding an alkaline material such as ammonium carbonate, sodium hydroxide or the like. The result of these treatments is to restore the mass to practically its original solid state, as if it had not been liquefied.

A similar liquefaction of silicone rubber may be obtained by the use of titanium tetrachloride by adding liquid titanium tetrachloride to the shredded rubber, and it has been found that a given weight of titanium tetrachloride will liquefy approximately ten times this weight of the rubber, that is, each gram of titanium tetrachloride will liquefy about 10 grams of gum. Reference to the use of titanium tetrachloride in a similar liquefying process employed to reclaim used silicone rubber will be made hereinafter.

The silicone rubber which we have employed is a commercial brand which may be purchased on the market, such, for example, as General Electric silicone rubber gum 9979–G and Dow-Corning Silastic G–125, but it will be understood that the process is not limited to these products alone. Such silicone rubbers can be properly described as products of polymerizing the product of hydrolysis of rectified dimethyldichlorosilane in the presence of ferric chloride or other catalysts.

It is believed that a chemical reaction takes place when the rubber is treated by the liquefying agent, this reaction serving to bring about the depolymerization or degradation of the high polymers of the rubber. For example, the silicone rubber may be represented by the following formula:

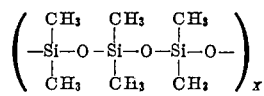

This compound is believed to exist in silicone rubber in polymeric molecules consisting of as many as several thousand —(CH$_3$)$_2$SiO— groups. In the liquefying reaction described above it is believed that the longer chains of silicone groups are broken apart; the molecular fragments combine with the parts of the liquefying agents used, and thus become capable of stable existence as independent molecules. For instance, it is probable that, when hydrochloric acid gas is used, the liquefying reaction, and its converse, are reactions of depolymerization and polymerization taking place according to the following reversible reaction:

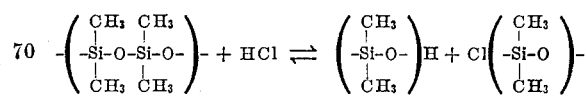

This is believed to be the first step of a series of reactions. In other words, the liquefaction reaction proceeds by the entrance of terminal groups (—Cl,—H in the reaction shown) into breaks in the polymer chains, thereby effecting a reduction in the average molecular weight of the polymers. As the liquefaction reaction proceeds in the presence of hydrochloric acid gas, we believe the smaller molecules each to acquire terminal chlorine groups by replacement of hydroxyl groups.

A similar result may be obtained from the use of many reagents other than hydrochloric acid and titanium tetrachloride referred to. In general, both organic and inorganic acids react in substantially the same way that hydrochloric acid gas does, provided they be used in an essentially anhydrous state or dissolved in a non-aqueous solvent, as the presence of water inhibits or may prevent the liquefying reaction if present to any great extent. Oxalic and benzoic acids, for example, react in alcoholic solutions, but not when dissolved in water. Even hydrochloric acid when dissolved in water has no liquefying effect on the polymerized gum as does the same substance in the essential absence of water. Hydrochloric acid gas dissolved in carbon tetrachloride will liquefy the rubber. Also the reaction will take place with sulfuric, nitric, and phosphoric acids, with acetic acid, trichloracetic acid, and generally with all other strong acids.

Chemical theory defines a strong acid in terms of its dissociation constant. For present purposes, we define a strong acid as one having a dissociation constant greater than 0.01.

Also silicon tetrachloride, antimony trichloride, and aluminum chloride react similarly to titanium tetrachloride, and probably other similarly reactive chlorides would give a similar result. Thionyl chloride effects the reactions, and other acid chlorides such as acetyl chloride, benzoyl chloride, phthalyl chloride and other similar compounds do the same.

We have observed that acids affect the liquefying reaction more or less in proportion to the strength of the acid; that is, strong anhydrous acids work faster than weak acids. Other compounds such as the metallic halides mentioned above and the acylhalides have one property in common; namely, that they may be called acid generating substances; by this is meant that in the presence of the slightest traces of moisture as in the air, such substances fume and generate hydrochloric acid. All such easily reactive substances which tend to generate hydrochloric acid appear to be liquefying agents to a greater or lesser extent depending on the individual acid generating substance used. The action of the metallic halides in the liquefaction process may involve a direct cleavage reaction analogous to the cleavage of ethers by aluminum chloride, zinc chloride, and boron trifluoride, and need not necessarily proceed through the intermediate formation of hydrochloric acid. Since water is generally largely excluded from the system, any such reaction of an acid generating substance will effectively create an anhydrous medium in which the liquefying reaction works best.

Some types of silicone rubber are insoluble in hydrocarbon solvents such, for example, as carbon tetrachloride. When, however, they are liquefied or depolymerized by the foregoing method, they are peptized or rendered soluble in such solvents, and this is one of the advantages which accrue from liquefying some insoluble silicone rubbers. Moreover, the molecular weight is greatly reduced as the depolymerized soluble rubber may have a molecular weight of between 500 and 100,000, and it will be obvious that there are many possible reactions with this product in addition to those herein enumerated.

For example, the short molecules may be again connected up to produce silicone rubber having properties differing from that in the original form. Also, the soluble rubber may be reacted in the presence of tri-functional silanes to promote cross-linking of the molecules at regular intervals across the chain.

The incorporation of reinforcing pigments in the liquefied gum obtained by the methods previously described, may be readily accomplished, and one example of this process is as follows:

*Example 2*

75 grams of Celite 505 (a finely divided diatomaceous earth supplied by Johns-Manville) are stirred in an agitating or mixing device such as a Waring blender with just enough carbon tetrachloride to form a thick paste. To this pigment paste is added 100 grams of liquefied silicone rubber (G. E. 9979-G) prepared as in Example 1 above, and the whole is thoroughly mixed for 5 minutes. The slurry at this point is quite thin. It is heated gently on a hot plate to remove the bulk of the carbon tetrachloride and the final residue of the solvent is removed by heating in circulating air in an oven at 212° F. This treatment also regenerates the rubber in its original state but now containing pigment in thorough mixture. At this point the compound is milled, benzoyl peroxide is added in this process and the resulting compound is then cured in the usual way.

Comparison of the properties of compounds prepared in this way with others made by the conventional method on a rubber mill show a substantial advantage for the method given in Example 2. Comparisons are given in the table below:

| Compound | Property | Mill Compound | Liquid Dispersion |
|---|---|---|---|
| 75 parts Celite 505, 100 parts Rubber | Tensile Strength | 300 p. s. i. | 540 p. s. i. |
| | Elongation | 100% | 110% |
| | Hardness, Shore A | 55 | 65 |
| 58 parts Celite 505 (25 vol.), 100 parts Rubber | Tensile Strength | 220 p. s. i. | 425 p. s. i. |
| | Elongation | 120% | 155% |
| | Hardness, Shore A | 46 | 50 |

Reference has previously been made to the use of the present liquefying process in the reclaiming of silicone rubber, and the following is an example of liquefying and reclaiming cured silicone rubber from scrap containing glass cloth as the filler and strengthening agent, using titanium tetrachloride as the liquefying agent:

*Example 3*

100 grams of silicone rubber (Dow-Corning Silastic G-125 coated on glass fabric and cured) is covered with a mixture of 400 grams of carbon tetrachloride and 10 grams of titanium tetrachloride. Intermittent gentle shaking over a period of about an hour is sufficient to liquefy all of the cured silicone rubber and remove it from the glass cloth. The solution which contains both the liquefied silicone rubber and the pigment that was compounded with it is filtered through a wire screen to separate the glass fibers. The glass fibers on the screen are washed with further small portions of carbon tetrachloride to recover all of the silicone rubber possible and the washings are added to the original solution.

The excess of titanium tetrachloride in the solution is decomposed by the addition of small successive amounts of water. The reaction at this point may be violent and hence care should be taken to add the necessary water very slowly. As a result of this treatment the titanium of the original titanium tetrachloride is converted to titanium dioxide in an extremely fine state of subdivision. This is chemically inert and an excellent pigment for the silicone rubber, with which it remains mixed.

The bulk of the carbon tetrachloride and water are evaporated from the product of this reaction and the mass is dried for 16 hours in an oven at 212° F. and then for 8 hours at 250° F.

The product can be compounded with any of a large number of commercial silicone rubber stocks in proportions as high as one of the former to two parts of the latter without appreciably affecting the properties of the cured product.

The recovery of silicone rubber by this method of reclaiming is actually greater than 100 per cent by reason of the fact that the completion of the operation converts the titanium in the reaction mixture to titanium dioxide which remains as an addition to the rubber batch. In the example, silicone rubber scrap used in the process consisted of two thirds silicone rubber and one third glass cloth, but the products of treating 100 grams of this scrap consisted of 34 grams of glass fibers and 70 grams of silicone rubber.

The reactions involved in the above processes may be explained by the equation above set forth or it is possible that liquefaction may occur in accordance with the following equation:

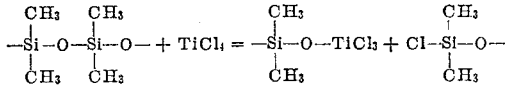

When the liquefying agent, hydrochloric acid or acid generating substance, in this case titanium tetrachloride, is removed by addition of water and by evaporation of solvent, the useful reclaimed silicone rubber is regenerated in solid form. The exact manner in which the small molecular fragments are rejoined cannot be easily represented accurately in the form of an equation. However, it is known that hydrochloric acid is evolved and titanium dioxide pigment is produced as the solid rubber is reformed.

While we have described the use of hydrochloric acid gas to liquefy silicone rubber and the use of titanium tetrachloride to liquefy cured silicone rubber as a method of reclaiming, it is apparent that either of these processes can be used interchangeably for either purpose. Thus, hydrochloric acid gas can be readily employed as a reagent for liquefying, and thus reclaiming, cured silicone rubber in very much the same way that we have described its use with new shredded rubber. Also new rubber can be liquefied by titanium tetrachloride in the same way that we have described its use in reclaiming. Furthermore, titanium tetrachloride can be used without a solvent by merely carrying out the reaction in the same way that we have described with hydrochloric acid gas except that the temperature of the reaction must be higher than 70° F. to maintain titanium tetrachloride in the vapor state (above about 275° F.). And hydrochloric acid gas can be used in solution in carbon tetrachloride in much the same way that we have described for titanium tetrachloride.

The liquefied silicone rubber prepared by our method may be advantageously used as a dipping and impregnating agent. The work required to use the liquefied rubber to impregnate porous sheets or fabrics is negligible in comparison with that of the sheeting and milling that would otherwise be required. Similarly, the use of our liquefied rubber is simpler and cheaper than dissolving the rubber in an appropriate solvent, impregnating the desired material with the solution, and then recovering the solvent. This, of course, may be applied to a great variety of porous materials (textile fabrics, paper, etc., of glass, asbestos, etc.), and the simplicity of regenerating the rubber in semi-solid form in the impregnated materials by contact with air or moisture vapor makes the whole operation simple, efficient and economical.

Another important advantage of our liquefied rubber is that the chemical compounds in it can be chlorinated directly by gaseous chlorine in the presence of ultra-violet radiation. In this case the methyl groups attached to the silicone atoms in the compound are chlorinated by the substitution of one chlorine for one hydrogen atom to give a final ratio up to 1Cl:4Si or even higher. We believe the reaction to follow this scheme:

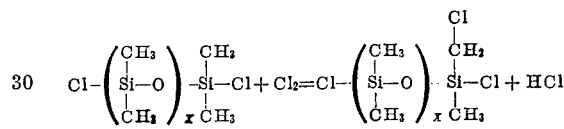

Reaction of the hydrogen chloride with the rubber may occur simultaneously. Compounds of this kind can be repolymerized in the manner indicated above and then cured in the usual way to give a somewhat harder product than that of the unchlorinated compounds and resembling resins or plastics a little more closely than they do rubbers. Further chemical reactions can be performed substituting other groups or atoms for the chlorine atoms to provide other types of compounds.

Treatment of the liquefied rubber with gaseous ammonia yields an oil that is considerably more stable to moisture than the liquefied gum from which it is made. Ammonium chloride is formed in the reaction and must be separated from the oil. Heating this oil converts it into a sticky gum that has excellent adhesive properties for joining silicone rubbers together, for instance. If the oil obtained by ammoniating liquefied rubber is treated with an acidic reagent such as hydrochloric acid, thionyl chloride, or benzoyl chloride, for example, a solid rubber is regenerated. This is the reverse of the action of these acidic reagents on the original gum, and occurs only if the quantity of acidic reagent added is carefully regulated to prevent adding an excess. An excess might initiate the liquefying reaction again.

A special and quite unexpected advantage is realized when our liquefied rubber, stabilized by treatment with ammonia as above, is used to impregnate glass cloth intended to form the filler in a silicone rubber sheet that is to be subjected to repeated flexings in use. The usual practice in preparing glass cloth for this service is to lubricate the fibers with starch to facilitate weaving and to remove this starch (by solution or hydrolysis, for instance) before the cloth is impregnated with the silicone. However, this leaves the glass cloth harsh and without a lubricant. When such glass cloth is impregnated with the compounded silicone rubber and cured in the usual way, the finished material has an extremely short flex life, as few as 8 to 10 flexing cycles of such a composite material being the best that can be regularly realized in service as a flexible diaphragm. If instead of simply milling or pressing the uncured rubber into the glass cloth after removal of the starch, the glass cloth is first impregnated with our stabilized liquefied rubber after removal of the starch and is then coated with uncured rubber in the ordinary manner, a substantial improvement in this respect is achieved. Instead of 8 to 10 flexes, a diaphragm made in this manner is still useful after more than a thousand flexings. Furthermore glass cloth acquires improved feel, hand, and draping qualities after it has been lubricated with our liquefied rubber and these are important improvements in its value for many other purposes even though it is not to be used as the filler and reinforcing agent in a silicone rubber compound.

Glycerol when added to the liquefied rubber stabilizes it in its liquid form. This stabilization may be accomplished by adding one part of glycerol to nine parts of the liquefied gum, and heating to 130° C., the reaction requiring from one to three hours. If after cooling, the excess glycerol is washed out of the liquid product with water, the product remains liquid. If the washing procedure is omitted, the reacted product hardens to the rubbery state and may be compounded in the usual way to give vulcanized silicone rubber of improved properties.

While we have illustrated and described some preferred embodiments of our invention, it is not to be limited to the exact process and combinations of steps described but is capable of modification and variation within the spirit of the invention and within the scope of the appended claims.

What we claim is:

1. The method which includes the steps of partially depolymerizing a solid polydimethylsiloxane elastomer to form a viscous liquid, filtering the material while in the liquid state to remove non-silicone solids present in the elastomer, and repolymerizing the material to form a modified solid polydimethylsiloxane, said depolymerization being accomplished by subjecting the solid elastomer at approximately room temperature to an essentially anhydrous acid chosen from the class consisting of hydrochloric acid, hydrobromic acid, hydriodic acid, thionyl chloride, acetyl chloride, benzoyl chloride and phthalyl chloride.

2. A method of reclaiming polydimethylsiloxane elastomer, which includes the steps of subjecting the solid polydimethylsiloxane elastomer to the action of essentially anhydrous hydrogen chloride for a few hours at room temperature to form a liquid product, filtering the liquid product to remove non-silicone solids present in the elastomer, recovering the purified liquid product, and subjecting the purified liquid to an elevated temperature to bring about a repolymerization thereof.

3. The method which includes the step of subjecting a solid polydimethylsiloxane elastomer to the action of essentially anhydrous hydrogen chloride at room temperature for a few hours until the polydimethylsiloxane is a highly viscous liquid.

BINGHAM J. HUMPHREY.
HARRY H. WASSERMAN.

References Cited in the file of this patent

UNITED STATES PATENTS

| Number | Name | Date |
| --- | --- | --- |
| 2,392,713 | Wright et al. | Jan. 8, 1946 |
| 2,430,032 | Scott | Nov. 4, 1947 |
| 2,438,478 | Hyde | Mar. 23, 1948 |
| 2,460,795 | Warrick | Feb. 1, 1949 |
| 2,550,003 | Daudt | Apr. 24, 1951 |
| 2,575,912 | Doyle | Nov. 20, 1951 |

OTHER REFERENCES

General Electric Silicone Rubber; filed U. S. Patent Office, February 14, 1949, pp. 5 and 13.